United States Patent [19]

Iwanaga et al.

[11] Patent Number: 5,360,871
[45] Date of Patent: Nov. 1, 1994

[54] VINYL CHLORIDE RESIN-BASED COMPOSITION AND PACKINGS MADE THEREFROM

[75] Inventors: Kentaro Iwanaga; Kiyoshi Sakai, both of Mie; Noriyoshi Yano, Kanagawa, all of Japan

[73] Assignees: Tosoh Corporation, Yamaguchi; Nippon Polyurethane Industry Co., Tokyo, Japan

[21] Appl. No.: 14,000

[22] Filed: Feb. 5, 1993

Related U.S. Application Data

[63] Continuation of Ser. No. 553,513, Jul. 18, 1990, abandoned.

[30] Foreign Application Priority Data

Jul. 18, 1989 [JP] Japan .................................. 1-183796
Feb. 20, 1990 [JP] Japan .................................. 2-37337
May 29, 1990 [JP] Japan .................................. 2-137174

[51] Int. Cl.$^5$ .......................... C08L 27/06; C08L 75/04
[52] U.S. Cl. .................................... 525/131; 525/129
[58] Field of Search ................................ 525/129, 131

[56] References Cited

U.S. PATENT DOCUMENTS 2,606,162  1/1949  Coffey et al. ..................... 525/129
5,225,487  7/1993  Kobayashi et al. ................ 525/131

FOREIGN PATENT DOCUMENTS 0323197    7/1989   European Pat. Off. .
1250478   12/1960   France .
1530132    5/1968   France .
1910852    9/1970   Germany .
2032297   12/1971   Germany ........................... 525/129
63-251413 10/1988   Japan .
1270836    4/1972   United Kingdom .

*Primary Examiner*—James J. Seidleck
*Assistant Examiner*—Thomas Hamilton, III
*Attorney, Agent, or Firm*—Sughrue, Mion, Zinn, Macpeak & Seas

[57] ABSTRACT

An improved vinyl chloride resin-based composite material is provided by melt-mixing a vinyl chloride resin with a polymeric polyol of 300–10,000 MW and a polyisocyanate having at least three isocyanate group under shearing force while allowing said polyol and polyisocyanate to react. The composite material has a content of tetrahydrofuran-insolubles of about 5–55% by weight. The composite material exhibits chemical and physical properties suitable for use in packing and sealing applications.

10 Claims, No Drawings

VINYL CHLORIDE RESIN-BASED COMPOSITION AND PACKINGS MADE THEREFROM

This is a continuation of application Ser. No. 07/553,513 filed Jul. 18, 1990 now abandoned.

This invention relates to a vinyl chloride resin-based composition suitable for use in applications where rubber elasticity is required, in particular to a resin composition exhibiting a good processability and excellent rubber elasticity, mechanical strength and aging resistance (and/or oil resistance) properties and to packings made from said composition.

There have been proposed several methods for improving the rubber elasticity property of vinyl chloride resins, for example:

method for crosslinking vinyl chloride resins with organic peroxides such as benzoyl peroxide, dicumyl peroxide, t-butyl peroxide and the like; diamines such as 1,4-tetramethylene diamine, 1,6-hexamethylene diamine and the like; or sulfur compounds such as elemental sulfer, tetramethylthiuram disulfide, triazine dithiol and the like;

method in which a component, such as diallyl phthalate, a crosslinkable polyurethane or an epoxy resin, blended with a vinyl chloride resin is crosslinked;

method in which a vinyl chloride resin is blended with a crosslinked vinyl chloride resin that has been crosslinked during the polymerization stage or with a crosslinked polymer, for example crosslinked NBR or polyurethane, which is highly compatible with the vinyl chloride resin; and method in which a vinyl chloride resin carrying reactive groups, such as hydroxyl groups, is treated with a crosslinking agent, such as a diisocyanate, to give a crosslinked resin.

Of these known methods, the method in which the vinyl chloride resin per se is crosslinked permits a rubber elasticity product to be easily produced, but suffers from problems, such as:

(1) that the product exhibits a poor thermal stability and is prone to discoloration;

(2) that the residual crosslinking agent, if any, will give out an offensive smell; and (3) that if a higher crosslinking degree is employed, then a larger amount of plasticizer is required to attain a specific level of hardness.

In the case where a reactive crosslinking agent is employed, since the process is often based upon a radical reaction system, it tends to suffer from the above-mentioned problems.

In the case where, a crosslinked vinyl chloride resin or crosslinked NBR, for example, is blended with a vinyl chloride resin substrate, there may be problems, such as:

(1) that significantly lowered physical properties, for example tensile strength, elongation, etc. can result in depending on the dispersibility of the employed agent in the substrate resin;

(2) that an increased amount of plasticizer will be required to regulate or adjust the hardness of product;

(3) that the impact resilience property is deteriorated; and (4) that if the crosslinked material is added in a larger amount, then the shapability becomes lowered.

Further, in the method where a vinyl chloride resin having reactive groups such as hydroxyl groups is employed and said resin is crosslinked, for example with a diisocyanate, since the reactants are generally less reactive, it is difficult to achieve an acceptable level of elasticity property in the product.

Recently, a good deal of attention has been focused on composites comprising vinyl chloride resins and polyurethanes. For example, there has been proposed a method in which a polyurethane is dissolved in vinyl chloride monomer (VCM) and then said VCM is polymerized to give a composite comprising the resulting vinyl chloride resin and said polyurethane. Also has been proposed a method comprising polymerizing VCM in the presence of a polyol to produce a vinyl chloride resin containing hydroxyl groups and subjecting said OH-containing vinyl chloride resin to urethanation so as to give a vinyl chloride resin/polyurethane composite. Further, it has been proposed to obtain a composite by impregnating a vinyl chloride resin with a polyol, isocyanate, catalyst, etc. and then allowing the mixture to undergo urethanation so as to give a composite product.

However, the composites of vinyl chloride resin and polyurethane prepared by these known methods are generally poor in their rubber elasticity properties and are not suitable for use in applications where the rubber elasticity is required. In a process for producing such a composite, if a triisocyanate is employed to form urethane-crosslink components, the resulting composite product will exhibit a poor processability.

Further, there is a conventional method for producing a vinyl chloride resin/polyurethane composite, said method comprising preparing a polymer blend of a vinyl chloride resin and a highly elastic polyurethane elastomer by means of roll or Banbury mixer. Though the composite prepared by the above method exhibits an excellent impact resilience, the composite is poor in the compression set property and it is desired to improve the defective property.

Depending upon the intended applications in which the packing materials are to be used, a variety of performance characteristics are required, for example gas-tight property, waterproofness, oil resistance, aging resistance, abrasion resistance, etc. In particular where vinyl chloride resins are used, problems of the gas-tight property, oil resistance and aging resistance will be presented. These problems are caused in relation to the flexibility and compression set properties of the material, the affinity between the oil and plasticizer, and the volatility of plasticizer.

The conventional vinyl chloride-based elastomers show, in particular, an unacceptable compression set property and a poor gas-tight property. Those to which a partially crosslinked NBR is added tend to deteriorate with the loss of the original performance characteristics when exposed to high temperatures and/or sunlight for an extended period.

In view of the above-discussed problems of the prior art, we have studied and researched the polyurethane component which is useful in vinyl chloride resin-based composite. As a result, we have now completed the present invention.

Accordingly, the present invention provides a vinyl chloride resin-based composition which is prepared from (i) a vinyl chloride resin, (ii) a polymeric polyol having two or more hydroxyl groups and a molecular weight in the range of from about 300 to about 10,000 and (iii) a compound having three or more isocyanate groups by thermally melting and mixing them together under shearing forces, said composition having a content of tetrahydrofuran (THF) insolubles of from about 5% to about 55% by weight. The invention provides also a packing material shaped or molded from such a composition.

The invention will be described hereinafter in detail.

The vinyl chloride resin which may be used in the invention is any one that is prepared by the conventional polymerization techniques, for example, by suspension polymerization, bulk polymerization, solution polymerization or emulsion polymerization.

The term "vinyl chloride resin" used herein is intended to include homopolymers of vinyl chloride as well as copolymers of vinyl chloride and any other monomer copolymerizable therewith.

The polymerization degree of vinyl chloride resin used ranges of from about 800 to about 8,000, and preferably from 1,000 to 5,000.

Examples of the monomers copolymerizable with vinyl chloride monomer include ethylene, propylene, butenes, pentene-1, butadienes, styrene, α-methyl styrene, acrylonitrile, vinylidene chloride, vinylidene cyanide, alkyl vinyl ethers, vinyl carboxylate esters, allyl ethers, dialkyl maleic acids, fumarate esters, N-vinyl pyrrolidone, vinyl pyridine, vinyl silanes, alkyl acrylate esters, alkyl methacrylate esters, etc.

The vinyl chloride resin used in the invention may be a graft copolymer such as an ethylene-vinyl acetate-vinyl chloride graft copolymer or a vinyl chloride-urethane copolymer. Also, a crosslinked vinyl chloride resin which has been prepared by adding a divinyl compound such as divinyl benzene to a vinyl chloride polymerization mixture being polymerized may be used in the invention. The crosslinked vinyl chloride resin to be used in the invention should have a content of tetrahydrofuran (THF) insolubles in the range of from about 0.1 to about 25% by weight. Such a crosslinked vinyl chloride resin may be employed either alone or as a blend with an uncrosslinked vinyl chloride resin.

The polymeric polyol used in the invention should have two or more hydroxyl groups in the molecule and a molecular weight in the range of from about 300 to about 10,000, preferably from 1,000 to 5,000. Such a polymeric polyol may be prepared, for example by condensation-polymerizing a $C_4$–$C_{10}$ aliphatic dicarboxylic acid with a $C_2$–$C_{10}$ aliphatic glycol and/or a glycol that is prepared by ring-opening polymerization of an epoxy group-containing compound and consists of 5 or less repeating units.

The term "molecular weight" used herein refers to the "number average molecular weight", which may be determined by, for example, the gel permeation chromatography (GPC) technique.

Examples of the $C_2$–$C_{10}$ aliphatic glycol which may be used for preparing the polymeric polyol include 1,2-ethane diol, 1,2-propane diol, 1,4-butane diol, butene diols, 3-methyl-1,5-pentane diol, 1,6-hexane diol, 1,10-decamethylene diol, 2,5-dimethyl-2,5-hexane diol, neopentyl glycol, 1,4-cychohexane dimethanol and the like.

Examples of the epoxy group-containing compound include cyclic ethers such as ethylene oxide, propylene oxide, tetrahydrofuran (THF), etc. The cyclic ether may be ring-opening polymerized to give a glycol consisting of 5 or less repeating units which may be used in preparation of the polymeric polyol.

The above-listed glycols may be used either alone or in combination.

Examples of the $C_4$–$C_{10}$ aliphatic dicarboxylic acid which may be used in preparation of the polymeric polyol include succinic, glutaric, adipic, azelaic and sebacic acids and the like. These may be used alone or in combination.

An example of commercially available polymeric polyol is "Nippollan" (a trade name) manufactured by Nippon Polyurethane Industry Co., Ltd.)

The amount of polymeric polyol added preferably ranges of from about 10 to about 170 parts by weight per 100 parts by weight of the vinyl chloride resin. If the amount is less than 10 parts by weight, the rubber elasticity is not improved to a satisfactory extent, while if the amount exceeds 170 parts by weight, then the product composition will become barely processable.

Examples of the compound having at least 3 isocyanate groups in the molecule include trimers of diisocyanates such as of 2,4- and 2,6-tolylene diisocyanates, m- and p-phenylene diisocyanates, 1-chlorophenylene-2,4-diisocyanate, 1,5-naphthalene diisocyanate, methylene bisphenylene-4,4'-diisocyanate, m- and p-xylene diisocyanates, hexamethylene diisocyanate, lysine diisocyanate, 4,4'-methylene biscyclohexyl diisocyanate, isophorone diisocyanate or trimethyl hexamethylene diisocyanate; triisocyanates such as 1,6,11-undecan triisocyanate, lysine ester triisocyanates, 4-isocyanate methyl-1,8-octamethyl diisocyanate; and polyfunctional isocyanates such as polyphenylmethane polyisocyanate. The compounds having at least 3 isocyanate groups may be employed singly or in combination. In addition to these compounds, any diisocyanate as above-listed may be used. However, in such a case, the ratio of NCO moles of the triisocyanate compound to NCO moles of the total isocyanate compounds should be preferably about 0.25 or greater. If the ratio is less than about 0.25, the frequency of occurrence of crosslinkings in the product appears to be too low to develop an acceptable performance.

The starting mixture has preferably an NCO/OH ratio in the range of from about 0.3 to about 1.3. If the ratio is less than about 0.3, the crosslinking frequency achieved would be too low to develop a satisfactory performance of the product composite, even if a triisocyanate compound(s) is solely employed as the isocyanate component. On the other hand, where the NCO/OH ratio exceeds about 1.3, it would be very difficult or impossible to process the product.

There are no critical restrictions imposed on used of plasticizers in the present compositions. Examples of the plasticizers which may be used in the present invention include phthalate plasticizers such as n-butyl phthalate, di-2-ethylhexyl phthalate (DOP), di-n-octyl phthalate, di-isooctyl phthalate, octyldecyl phthalate, di-isodecyl phthalate, butylbenzyl phthalate and di-2-ethylhexyl isophthalate; aliphatic ester plasticizers such as di-2-ethylhexyl adipate (DOA), di-n-decyl adipate, isodecyl adipate, dibutyl sebacate and di-2-ethylhexyl sebacate; trimellitate plasticizers such as trioctyl and tridecyl trimellitates; pyromellitate plasticizer such as tetra-octyl pyromellitate; phosphate ester plasticizers such as tributyl, tri-2-ethylhexyl, 2-ethylhexyl diphenyl or tricresyl phosphate; epoxy plasticizers such as epoxidized soy bean oil or epoxidized linseed oil; and polymeric plasticizer, for example a condensation polymerization product derived from adipic or sebacic acid and a glycol and having an average molecular weight of 500–10,000. The above-listed members may be used singly or in any suitable combination.

In order to obtain a highly rubber elastic composition that is a composition having a high level of impact resilience and a low level of compression set, a plasticizer which is of a low molecular weight and is able to highly effectively plasticize the vinyl chloride resins is desirably used, for example, di-n-butyl phthalate, di-2-ethylhexyl phthalate (DOP) or di-2-ethylhexyl adipate (DOA).

Where it is desired to obtain a composition exhibiting excellent oil resistance and heat resistance properties, use of a low molecular weight plasticizer should be avoided and an NCO/OH ratio of the urethane ingredients in the range of from 0.3 to 0.8 should be selected. Alternatively, for the same purpose, a relatively high molecular weight plasticizer selected from the phthalate, adipate or sebacate plasticizers may be used.

In particular, if the composition of the present invention is to be used in the packing applications where an enhanced aging resistance and/or oil resistance property is often required, the plasticizer used should be selected depending upon the intended use and upon the specific tests that the composition has to pass. For example, where the composition should have an aging resistance property, though it is possible to use the above-listed plasticizers, desirably a trimellitate, or pyromellitate or adipate, or relatively high molecular weight sebacate plasticizer that gives rise to a satisfactory aging resistance property should be selected and used depending upon the intended use. Where the composition should have an aging resistance property in combination with an oil resistance property, it is desirable to select and use a relatively high molecular weight adipate or sebacate plasticizer that will satisfy the requisites.

In preparation of the present composition, a catalyst may be employed. Though the reaction involved may proceed in the absence of catalyst, use of the catalyst permits the reaction to uniformly proceed and is preferred. The catalyst may be any one of the conventional catalysts used for urethanation. For example, amine catalysts such as triethyl amine, triethylene diamine and N-methyl morpholine; and tin catalysts such as tetramethyl tin, tetraoctyl tin, dimethyl dioctyl tin, triethyl tin chloride, dibutyl tin diacetate and dibutyl tin dilaurate may be mentioned.

In the invention, a stabilizer may be added to the vinyl chloride resin. Examples of the stabilizer which may be used include metallic soap stabilizers such as lead, calcium, barium, zinc or cadmium stearate; and epoxy stabilizers such as epoxidizd soy bean oil and epoxidized linseed oil.

If desired or necessary, the conventional additives, for example, UV absorber, antioxidant, aging resistant agent, processing aid, filler, etc. may be incorporated. However, if a tin-containing stabilizer is used in the composition, this may act as a hydrolysis catalyst on a polyester polyol, if any. Therefore, use of such a tin-containing stabilizer in combination with a polyester polyol should be avoided.

The composition according to the invention may be prepared by means of a kneader, for example, a roller machine, twin-screw kneader, extruder, Banbury mixer or the like, which is capable of melting and shearing a resin. In particular, for example, where a Banbury mixer is employed, the casing temperature is set at a suitable temperature, for example, in the range of 100°–200° C. and then a vinyl chloride resin and any optional additive such as a conventional UV absorber, antioxidant, aging resistant agent, processing aid and/or filler are charged and mixed together. Then a polyol, an isocyanate and optionally a plasticizer which have been separately heated and maintained at temperatures, for example, in the range of 50°–80° C., are metered and mixed together and thereafter charged into the Banbury mixer. The interior temperature is raised to a level, for example, in the range of 100°–200° C., with applying shearing forces on the charged materials. The heating and mixing are continued so that the vinyl chloride resin undergoes melting and the urethanation is caused to occur. After a period of, for example, from 3 to 60 minutes, the mixture is discharged. The resulting resin composition may be formed into sheet, for example, by a roll or calender machine.

The composition according to the invention should exhibit a content of THF insolubles in the range of about 5–55% by weight. If the THF insolubles content is less than about 5% by weight, a satisfactory level of compression set will not be achieved by the composition. If the THF insolubles content is greater than about 55% by weight, the composition will exhibit poor shapability properties.

The THF insolubles content may be determined as follows:

A rolled sheet of a thickness of 1.0±0.1 mm is cut into 1.0–1.5 mm square pieces which are weighed out in a quantity of 1.0 g. The sample is transferred into a 300 cc capacity beaker containing 200 ml of tetrahydrofuran (THF) and stirred for a period of 2 hours by means of a stirrer. The sample which has been swollen by the THF is filtered off using a 300-mesh sieve. The retained material is ground for example with a glass rod. The ground filter cake is again stirred in 200 ml of THF for a further 4 hours. The thus resulting solution is filtered through a filter paper which has been weighed. The filter paper retaining the filtered-off insolubles thereon is placed on a petri dish, dried in an oven at 40° C. for 5 hours and then weighed. The thus measured weight of the insolubles is used to calculate a weight percentage of insolubles in the sample.

The term "packing material" is used herein to mean the so-called sealing material such as gasket, packing or the like. These materials are used in a variety of applications, for example, of automobiles, buildings, machine parts, electrical equipments, ships, precision instruments and the like. Particular examples which may be mentioned include gaskets for use in lamps (e.g. fog and tail lamps) and weather strips in the automobile application; window frame sealings and door packings in the building application; door sealing packings in kitchen furnitures (e.g. refrigerators); and water-proofing rubber materials which are particularly needful in the precision instrument application. Examples of the machine parts which may be mentioned include sealing elements such as O-ring and U packing; frange gasket, bearing seal, joint seal, gas-pipe seal, plumbing seal; etc. The packing materials of the present invention may be also used in a wide range of applications in addition to the above-listed applications.

EXAMPLE

The invention will be illustrated in more detail with reference to the following specific Examples. However, it is not intended to limit the scope of the invention to these specific Examples.

EXAMPLE 1

Into a Banbury mixer of a 1700-cc capacity, 500 g of a vinyl chloride resin produced by suspension polymerization (commercially available under trade name Ryuron E-2800 from Tosoh Corporation; average polymerization degree=2800), 12 g of barium stearate and 5.4 g of zinc stearate as stabilizer, and 7.5 g of an amine-uptaking agent (available under trade name BP-331 from Nissan Ferro-Organic Chemical Co., Ltd.) were charged. The casing temperature of the mixer was 150° C. The charged materials were agitated at a constant revolution rate.

In a vessel, 350 g of a polymeric polyol having a number average molecular weight of 2,000 (commercially available under trade name Nippollan 4067 from Nippon Polyurethane Industry Co., Ltd.) and 450 g of di-2-ethylhexyl phthalate (DOP), both of which had been preheated and kept at 70° C., were mixed together. To the mixture, 58.6 g of hexamethylene diisocyanate trimer (commercially available under trade name Coronate EH from Nippon Polyurethane Industry Co., Ltd.) and 0.03 g of dibutyl-tin-dilaurate catalyst were added. The resulting mixture (NCO/OH ratio=1) was mixed for 1 minute and thereafter poured into the mixture being agitated in the Banbury mixer. The total mixture was allowed to react for a further 15 minutes with continuous mixing.

At the end of the reaction period, the resulting composite material was rolled into a sheet, which was pressed down to a thickness of 12.70±0.13 to be tested for the compression set property in accordance with Japanese Industrial Standard (JIS) K 6301. Test specimens taken from the pressed sheet were used to determine compression set (JIS K 6301) and JIS-A hardness (JIS K 6301). The content of THF insolubles (% by weight) was also determined.

The results are shown in Table 1 below.

EXAMPLE 2

The procedure of Example 1 was repeated except that the polyol (Nippollan 4067), isocyanate (Coronate EH) and DOP were employed in amounts of 300 g, 50.2 g and 400 g, respectively.

The results are shown in Table 1.

EXAMPLE 3

The procedure of Example 2 was repeated except that two vinyl chloride resins were employed in combination, one being 300 g of Ryuron E-2800 and the other being 200 g of a vinyl chloride resin which had been prepared using a crosslinking agent by suspension polymerization and contained 0.7% by weight of THF insolubles (average polymerization degree of said THF insolubles=2,000).

The results are shown in Table 1.

COMPARATIVE EXAMPLE 1

Into a Henschel mixer, 1 kg of the vinyl chloride resin as used in Example 1, 24 g of barium stearate, 10.8 g of zinc stearate and 1.1 kg of DOP were charged and heated and agitated at 120° C. to dry up the mixture. The resulting vinyl chloride resin composition was pressed into sheet. Test specimens prepared from the pressed sheet were used to determine compression set (JIS K 6301) and JIS-A hardness (JIS K 6301).

The results are shown in Table 1.

COMPARATIVE EXAMPLE 2

The procedure of Comparative Example 1 was repeated except that 1 kg of the vinyl chloride resin containing 0.7 wt % THF insolubles as used in Example 3 was employed in place of the vinyl chloride of Comparative Example 1 and that the DOP was used in an amount of 1.2 kg.

The results are shown in Table 1.

COMPARATIVE EXAMPLE 3

The procedure of Example 2 was repeated except that 25.1 g of hexamethylene diisocyanate was used in place of the triisocyanate (i.e. Coronate EH) (NCO/OH ratio=1).

The results are shown in Table 1.

EXAMPLE 4

The procedure of Example 1 was repeated except that 500 g of a vinyl chloride resin (commercially available under trade name Ryuron TH-1300 from Tosoh Corp.; an average polymerization degree of 1300) was used in place of Ryuron E-2800 and that the polymeric polyol (Nippollan 4067), the isocyanate (Coronate EH) and DOP were used in amount of 400 g, 66.9 g and 500 g, respectively.

The results are shown in Table 1.

EXAMPLE 5

The procedure of Example 4 was repeated except that 500 g of a vinyl chloride resin obtained by the conventional suspension polymerization technique and showing an average polymerization degree of 4,200 was used in place of the vinyl chloride resin used in Example 4 and 450 g of dibutyl phthalate (DBP) plasticizer was used in place of the DOP plasticizer used in Example 4.

The results are shown in Table 1.

EXAMPLE 6

Similarly to Example 1, a Banbury mixer was charged with 400 g of a vinyl chloride resin (Ryuron E-2800), 9.6 g of barium stearate stabilizer, 4.3 g of zinc stearate stabilizer and 6 g of BP-331 amine-uptaking-agent. The charged materials were heated and mixed together.

A polymeric polyol (Nippollan 4067; 600 g) and DBP (360 g) which had been heated and maintained separately at 70° C. were brought together in a vessel, to which an isocyanate (Coronate EH; 110.5 g) and dibutyl tin dilaurate catalyst (0.07 g) were added (NCO/OH ratio=1.1) and mixed for 1 minute. The resulting mixture was poured into the mixture being agitated in the Banbury mixer.

The mixture was processed and tested as in Example 1.

The results are shown in Table 1.

TABLE 1

| Examples | Hardness, JIS-A (Initial/ After 10 secs.) | Impact Resilience (%) | Compression Set (%) | THF Insolubles (wt. %) |
| --- | --- | --- | --- | --- |
| Ex. | | | | |
| 1 | 46/43 | 47 | 38 | 25.1 |
| 2 | 49/45 | 40 | 44 | 23.2 |
| 3 | 49/45 | 38 | 43 | 23.4 |
| 4 | 38/35 | 41 | 47 | 25.2 |
| 5 | 50/48 | 53 | 39 | 26.0 |
| 6 | 51/49 | 56 | 26 | 48.4 |
| Comp. | | | | |

TABLE 1-continued

| Examples | Hardness, JIS-A (Initial/ After 10 secs.) | Impact Resilience (%) | Compression Set (%) | THF Insolubles (wt. %) |
|---|---|---|---|---|
| Ex. | | | | |
| 1 | 49/44 | 37 | 59 | 0.0 |
| 2 | 49/45 | 45 | 52 | 0.2 |
| 3 | 46/39 | 42 | 57 | 0.0 |

EXAMPLE 7

Similarly to Example 1, a Banbury mixer was charged with a vinyl chloride resin (Ryuron E-2800; 500 g), barium stearate stabilizer (12 g), zinc stearate stabilizer (5.4 g) and BP-331 amine-uptaking agent (7.5 g). The charged materials were heated and mixed together.

A polymeric polyol (Nippollan 4067; 350 g) and trioctyl trimellitate (TOTM) plasticizer (500 g) which had been heated and maintained separately at 70° C. were brought together in a vessel, to which an isocyanate (Coronate EH; 58.6 g) and dibutyl tin dilaurate catalyst (0.03 g) were added (NCO/OH ratio=1) and mixed for 1 minute. The resulting mixture was poured into the mixture being agitated in the Banbury mixer. The mixture was processed as in Example 1. Upon completion of the reaction, the resulting composite material was rolled into a sheet, which was pressed down to give specimens to be tested for the hardness, tensile strength, elongation, aging resistance, oil resistance and compression set properties in accordance with the general test methods specified in JIS K 6380 (Industrial Rubber Packing Material).

Summary of the tests:
(1) Hardness: determined with a spring hardness tester (A type) of JIS K 6301.
(2) Tensile Strength and Elongation: determined using a No. 3 dumbbell specimen according to JIS K 6301.
(3) Aging Resistance: retention of tensile strength and retention of elongation retained after the aging test and hardness change after the aging test were determined according to JIS K 6301.
Aging test condition: 100° C., 70 hours
(4) Compression Set: determined in accordance with JIS K 6301.
(5) Oil Resistance: volume change was determined after the oil resistance test according to JIS K 6301.
Oil resistance test conditions:
Condition I: 100° C., 70 hours using No. 1 test oil in accordance with JIS K 6301
Condition II: 100° C., 70 hours using No. 3 test oil in accordance with JIS K 6301
The results are shown in Table 2.

EXAMPLE 8

The procedure of Example 7 was repeated except that a commercially available adipate-based polyester plasticizer (trade name Adekacizer PN-310; manufactured by Adeka Argus Chemical Co., Ltd.; average molecular weight 2500) was employed in an amount of 500 g in place of the plasticizer used in Example 7.
The results are shown in Table 2.

EXAMPLE 9

The procedure of Example 8 was repeated except that 400 g of TOTM and 100 g of DOP were used as plasticizer in place of the plasticizer of Example 8.
The results are shown in Table 2.

EXAMPLE 10

The procedure of Example 9 was repeated except for that 400 g of an adipate-based polyester plasticizer (Adekacizer PN-310) and 100 g of DOP were used as plasticizer.
The results are shown in Table 2.

EXAMPLE 11

Similarly to Example 10, a vinyl chloride resin (Ryuron E-2800; 400 g), barium stearate stabilizer (9.6 g), zinc stearate stabilizer (4.3 g), BP-331 amine-uptaking agent (6 g) and commercially available calcium carbonate (trade name Hakuenka CCR; manufactured by Shiraishi Kogyo Co., Ltd.; 400 g) were charged into a Banbury mixer.

A polymeric polyol (Nippollan 4067; 280 g) and TOTM (400 g) which had been heated and maintained separately at 70° C. were brought together in a vessel, to which an isocyanate (Coronate EH; 46.9 g) and dibutyl tin dilaurate (0.02 g) were added (NCO/OH ratio=1) and mixed for 1 minute. The resulting mixture was poured into the mixture being agitated in the Banbury mixer. The mixture was processed and tested as in Example 10.
The results are shown in Table 2.

EXAMPLE 12

The procedure of Example 11 was repeated except that a commercially available adipate-based polyester plasticizer (Adekacizer PN-310,; 400 g) was employed.
The results are shown in Table 2.

TABLE 2

| Examples | Ex. 7 | Ex. 8 | Ex. 9 | Ex. 10 | Ex. 11 | Ex. 12 |
|---|---|---|---|---|---|---|
| Hardness, JIS-A | 45 | 47 | 43 | 44 | 58 | 62 |
| Tensile Strength (kgf/cm$^2$) | 115 | 112 | 106 | 105 | 145 | 152 |
| Elongation (%) | 450 | 510 | 430 | 495 | 480 | 535 |
| Aging Resistance | | | | | | |
| Tensile Strength retained (%) | 99 | 102 | 105 | 104 | 100 | 101 |
| Elongation retained (%) | 99 | 101 | 96 | 97 | 100 | 100 |
| Hardness Change | 0 | 0 | +1 | +1 | 0 | 0 |
| Oil Resistance | | | | | | |
| Conditions I: Volume Change (%) | −15 | −3 | −20 | −10 | −12 | −2 |
| Conditions II: Volume Change (%) | −4 | +8 | −10 | +1 | −3 | +5 |
| Compression Set (%) | 41 | 41 | 40 | 40 | 43 | 43 |
| THF Insolubles (wt. %) | 23 | 23 | 23 | 23 | 42 | 41 |

From the foregoing, it is clear that the rubber elastic vinyl chloride resin-based composition of the present invention exhibits excellent pliability and shapability properties. The present vinyl chloride resin-based composition is also characterized by a high level of impact resilience and a low level of compression set.

By appropriately selecting and using a plasticizer, the aging resistance and/or oil resistance property of the present composite may be significantly improved. Such an improvement will be useful particularly in packing applications.

What is claimed is:

1. A vinyl chloride resin-based composition which is prepared from a mixture of (i) a vinyl chloride resin, (ii) a polymeric polyol having two or more hydroxyl groups and a molecular weight of from about 300 to about 10,000 and (iii) a compound having three or more isocyanate groups, by thermally melting and mixing them under shearing forces to react said polymeric polyol and said compound having three or more isocyanate groups, said composition having a content of tetrahydrofuran-insolubles of about 5% to about 55% by weight, wherein the mixture has an NCO/OH ratio in the range of about 0.3–1.3 before said melting and mixing under shearing forces which reacts them.

2. A composition as claimed in claim 1 wherein said vinyl chloride resin has a polymerization degree of about 800–8,000 and is selected from vinyl chloride homopolymer and copolymers, vinyl chloride graft polymer and crosslinked vinyl chloride polymers.

3. A composition as claimed in claim 1 or 2 in which said polymeric polyol has a molecular weight of about 1,000–5,000.

4. A composition as claimed in claim 1 in which said polymeric polyol is employed in a proportion of about 10 parts to about 170 parts by weight per 100 parts by weight of said vinyl chloride resin.

5. A composition as claimed in claim 1 in which said polyisocyanate compound is selected from trimers of diisocyanates; triisocyanates; and polymeric polyfunctional isocyanates.

6. A composition as claimed in claim 1 in which one or more plasticizers are also included.

7. A composition as claimed in claim 1 in which a catalyst is used to react said polymeric polyol and said compound having three or more isocyanate groups.

8. A composition as claimed in claim 1 in which is included one or more members selected from stabilizer, UV absorbing agent, antioxidant, aging resistant agent, processing aid and filler.

9. A packing material prepared from the vinyl chloride resin-based composition as claimed in claim 1.

10. A method for preparing the vinyl chloride resin-based composition as claimed in claim 1, which comprises:

introducing a vinyl chloride resin and any optional additive other than plasticizer into a kneader and mixing at temperatures of about 100°–200° C.;

preheating separately a polyol, a polyisocyanate and optionally a plasticizer to temperatures of about 50°–80° C. and mixing the preheated materials together in predetermined relative proportions;

charging said preheated and formulated mixture into said kneader;

heating the total mixture to temperatures of about 100°–200° C. in said kneader so as to melt said vinyl chloride resin and to allow said polyol and polyisocyanate to mutually react, with continuous mixing under shearing forces; and discharging the resulting resinous composition from said kneader, wherein the mixture has an NCO/OH ratio in the range of about 0.3–1.3 before the mutually reacting.

* * * * *

UNITED STATES PATENT AND TRADEMARK OFFICE
CERTIFICATE OF CORRECTION

PATENT NO. : 5,360,871
DATED : November 1, 1994
INVENTOR(S) : Kentaro Iwanaga, et. al.

It is certified that error appears in the above-indentified patent and that said Letters Patent is hereby corrected as shown below:

Title page, item [73], Assignee, after "Co.," insert --, Ltd.--

Signed and Sealed this

Fourteenth Day of February, 1995

Attest:

BRUCE LEHMAN

Attesting Officer        Commissioner of Patents and Trademarks